United States Patent [19]

Haines et al.

[11] Patent Number: 5,237,433
[45] Date of Patent: Aug. 17, 1993

[54] METHODS OF HOLOGRAM CONSTRUCTION USING COMPUTER-PROCESSED OBJECTS

[76] Inventors: Kenneth A. Haines, 511 Sir Francis Drake, C-377, Greenbrae, Calif. 94904; Debby L. Haines, 22025 Hutchinson Rd., Los Gatos, Calif. 95030

[21] Appl. No.: 816,807

[22] Filed: Jan. 3, 1992

[51] Int. Cl.$^5$ .................. G03H 1/08; G03H 1/26
[52] U.S. Cl. .................. 359/9; 359/26; 359/33
[58] Field of Search ............ 359/9, 22, 23, 25, 26, 359/33, 8

[56] References Cited

U.S. PATENT DOCUMENTS

| | | | |
|---|---|---|---|
| 3,533,673 | 10/1970 | Lin | 359/9 |
| 3,533,676 | 10/1970 | Lin | 359/23 |
| 3,947,085 | 3/1976 | Mottier | 359/33 |
| 4,109,996 | 8/1978 | Ersoy | 359/9 |
| 4,206,965 | 6/1980 | McGrew . | |
| 4,339,168 | 7/1982 | Haines . | |
| 4,364,627 | 12/1982 | Haines | 359/23 |
| 4,411,489 | 10/1983 | McGrew . | |
| 4,778,262 | 10/1988 | Haines . | |
| 4,834,476 | 5/1989 | Benton | 359/23 |
| 4,969,700 | 11/1990 | Haines . | |
| 5,044,708 | 9/1991 | Garcon | 359/33 |
| 5,111,313 | 5/1992 | Shires | 359/23 |

FOREIGN PATENT DOCUMENTS 1089262 11/1980 Canada .

OTHER PUBLICATIONS

J. W. Goodman, *Introduction to Fourier Optics*, McGraw Hill, pp. 83-88 (no date).
"A New Approach to Computer-Generated Holography," M. C. King, et al., Applied Optics, vol. 9, No. 2, Feb. 1970.
"Image Processing Technique for Arbitrary Image Positioning in Holographic Stereogram," Der-Kuan Kang, et al., Optics Communications, vol. 80, No. 1, Dec. 1990.
"Computer-Generated Rainbow Holograms," Detlef Leseberg, et al., Applied Optics, vol. 23, No. 14, Jul. 1984.
"Stereoscopic Approach to 3-D Display Using Computer-Generated Holograms," Toyohiko Yatagai, Applied Optics, vol. 15, No. 11, Nov. 1976.
"Three-Dimensional Image Processing for Synthetic Holographic Stereograms", Mark Sep., 1986, pp. 1-86.

*Primary Examiner*—Martin Lerner
*Attorney, Agent, or Firm*—Limbach & Limbach

[57] ABSTRACT

Computer-processed or computer-generated objects can be used to build holograms whose images are close to or straddle the hologram surface. No preliminary or first hologram is required. The hologram is built up from a number of contiguous, small, elemental pieces. Unorthodox views from inside the object are required for the creation of these elements. One method of generating the views employs unique object manipulations. The computational transformations ensure that no singularities arise and that more-or-less conventional modeling and rendering routines can be used. With a second method, a multiplicity of conventional object views are collected. Then, all pixels in these conventional viewplanes are reassigned to new and different locations in the new viewplanes for the elemental views. These methods may be used to build rainbow holograms or full parallax holograms. When properly executed they are visually indistinguishable from other types.

17 Claims, 6 Drawing Sheets

METHODS OF HOLOGRAM CONSTRUCTION USING COMPUTER-PROCESSED OBJECTS

BACKGROUND OF THE INVENTION

Classical holograms are most commonly created by recording the complex diffraction pattern of laser light reflected from a physical object. These holograms can reconstruct images of sub-micron detail with superb quality. Ever since the early days of holography, there has been considerable interest in forming holograms of computer generated objects by computing and recording their diffraction patterns. These holograms are usually referred to as computer generated holograms, or CGH's. The computational task is a formidable one because of the enormity of the data required for good imagery. For example, a typical 10 centimeter by 10 centimeter hologram can resolve more than $10^{14}$ image points. Furthermore, no portion of the hologram surface pattern can be completely calculated until the diffraction transformation has been carried out on every one of these resolvable points. This necessitates the use of a rather large active memory; $10^{10}$ bytes for our hypothetical 10×10 centimeter hologram.

Even more problematic is the requirement that, for viewing over a reasonable angle, this information must be deposited into the hologram surface at a density of less than 1 pixel per micron and with about 24 bits of intensity per pixel. Many schemes have been developed for recording in a binary fashion, a process which further reduces the required pixel size.

Holograms can be composed from a multiplicity of independent object view, as was discussed in a paper by King, et al, published in Applied Optics in 1970, entitled "A New Approach ·to Computer-Generated Holograms." These holograms are the type discussed in this disclosure wherein they are referred to as 'composite' holograms. A rather elementary but effective technique for creating composite holograms with computer generated images borrows holographic technology which was developed for other media; most notably cinematography film of physical objects. This process is discussed in a patent by K. Haines which issued in July 1982 as U.S. Pat. No. 4,339,168.

In a common embodiment of this method, many conventional views of an object are collected along a simple linear or circular trajectory. Each of these views is then processed in an optical system to build up portions of a first or storage hologram (sometimes referred to as an h1. This storage hologram bears some similarity to the drum multiplex holograms, examples of which contain fully rendered computer images.

The image from this storage hologram, as with all holographic images, is best reconstructed when the hologram is illuminated with a specific light source located at a predetermined position. Otherwise an image degradation results which is a function of the distance between the image points and the hologram surface. In order to make a hologram which is clearly discernable, even under adverse lighting conditions, one should therefore construct an image-plane hologram in which the image straddles the hologram plane.

In order to make an image-plane hologram, the image from the first hologram is used as an object which is recorded in a second hologram, which is frequently referred to as an h2. The laser light rays which constituted the object of the h1, are reconstructed (a rather unique capability of holography) by reversing the direction of the h reference beam. This results in the construction of a 3D image of the original object, albeit a pseudoscopic or inside-out image, in a space which is now accessible for placement of an h2. The h2 is located on a plane within the image volume.

With many image-plane holograms, the viewability is further enhanced under polychromatic (white light) illumination with the elimination of vertical parallax in the image. Vertical parallax is deleted from the h1 (and the h2 which is derived from it) when a variety of vertical views is not collected. Consequently the viewer is prohibited from seeing over or under an image. The three dimensionality is retained only in the horizontal direction. Holograms which lack vertical parallax are commonly called rainbow holograms because the viewer moving his eyes vertically perceives an image which changes colors throughout the spectrum when the hologram is illuminated with a white light source. Although rainbow holograms contain images with incomplete three dimensionality, economy is realized since the requisite computed views need not span a vertical as well as horizontal range.

The making of a hologram by the procedure just described is laborious. It requires the construction of a first hologram, an h1, which is ultimately obsolete. A direct approach was introduced in U.S. Pat. No. 4,778,262 which was granted in October 1988. That technique requires no h1 construction. Each portion of the computed data is used to create a tiny elemental image-plane hologram directly. These elements are placed side by side to form the composite hologram.

This direct method can be very difficult to implement. The common methods of computer image generation must be highly modified. Otherwise their use will yield images which are unacceptably distorted. In a related process in which normal views of an image (i.e. no image-plane views) are collected, and then recomposited to form elemental views, unorthodox processing is required.

SUMMARY OF THE INVENTION

It is an object of the present invention to provide analytical processes for the construction of a hologram from a computer generated object, the image of which is reconstructed close to or straddling the hologram surface, such processes requiring no lens or first hologram to image the object onto the hologram surface.

It is another object of the present invention to provide transformations which will allow conventional computer-generated image data to be converted into a format which is convenient for construction of a hologram whose image straddles the hologram surface without requiring construction of an intermediate hologram.

It is yet another object of the invention to provide an easy method of computing and recording on a bit-by-bit basis, computer-generated hologram elements which form components of a larger composite hologram.

These objectives and others are accomplished by the methods briefly described in the following. A portion of the object data is used to create each individual small image-plane hologram element. Prior to rendering for the view required of each element, the model is divided into two separate volumes. Each volume represents a portion of the object on either side of the hologram, or primary, plane which passes through the model. This division first requires the insertion of two new clipping planes which are placed imperceptibly close to, but on either side of the primary plane. Additionally, points must be included in these clipping planes to preserve the integrity of the model. This procedure guarantees that (a) no singularities will be present in the latter processing due to points on the primary plane, and (b) distortions in the image will not occur that would otherwise arise due to ambiguities of surfaces which pass through the primary plane. Once these procedures are carried out, transformations unique to this image-plane, direct process may be carried out. After these transformation procedures, conventional rendering methods can be employed for each of the two object volumes. A hierarchical process favors the object volume on the observer side of the hologram for the first surface calculations when the volumes are recomposited. This procedure results in images which retain both vertical and horizontal parallax.

It is often desirable to discard vertical parallax in holographic images of computed data. This presents additional problems when attempts are made to use homogeneous coordinate transformations which are common in computer graphics. Here again, unorthodox procedures are required. These involve the use of a non-homogeneous coordinate transformations and the pre-rendering insertion of a sufficiently fine mesh over the object surface.

A computationally indirect method (although still a direct or one-step hologram construction method) is disclosed in this patent. With this method the required elemental views are obtained by re-sorting the pixels contained in a series of conventionally rendered object views. This sorting transformation is described herein.

DETAILED DESCRIPTION OF THE PREFERRED EMBODIMENTS

Figure 1:
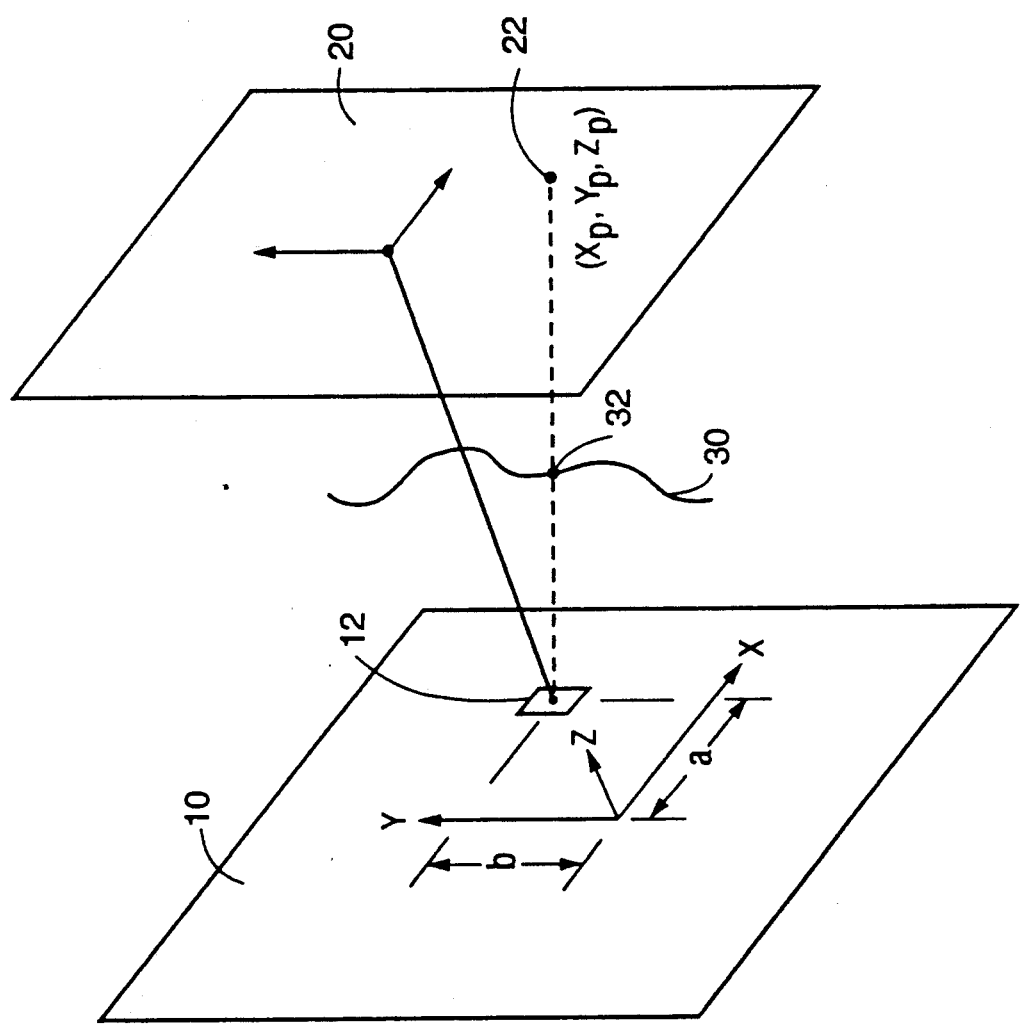
FIG. 1 illustrates the geometry used for calculations of the method.

The process of making a hologram directly from computer-generated image data is referred to in this disclosure as a one-step procedure. In this process, small hologram elements are constructed and placed more-or-less contiguously to form a larger composite hologram. The computation of each elemental view required for each hologram element, which is the subject of this disclosure, is described with reference to FIG. 1. The x and y axis lie on the hologram surface 10. A typical hologram element 12 is shown which is located at a distance 'a' in the x direction and 'b' in the y direction from the center of the coordinate system in the hologram plane. The viewplane (window plane) 20, which contains the array of pixels 22, etc. for this element 12, is selected to be parallel to the hologram plane and displaced from it by a distance $z_p$. Pixels, such as 22, are located on this viewplane by coordinate values $x_p$, $y_p$ and $z_p$.

For the typical element 12, the generalized object point 32, located at position x, y, z, in object 30, results in the viewplane point 22. The matrix equation 1 describing this relationship is;

$$\begin{bmatrix} x_p \\ y_p \\ 0 \\ 1 \end{bmatrix}_{a,b} = \tag{1}$$

$$\begin{bmatrix} 1 & 0 & 0 & 0 \\ 0 & 1 & 0 & 0 \\ 0 & 0 & 0 & 0 \\ 0 & 0 & 0 & 1 \end{bmatrix} \begin{bmatrix} 1 & 0 & 0 & 0 \\ 0 & 1 & 0 & 0 \\ 0 & 0 & C & D \\ 0 & 0 & 1/z_p & 0 \end{bmatrix} \begin{bmatrix} 1 & 0 & 0 & -a \\ 0 & 1 & 0 & -b \\ 0 & 0 & 1 & 0 \\ 0 & 0 & 0 & 1 \end{bmatrix} \begin{bmatrix} x \\ y \\ z \\ 1 \end{bmatrix}$$

These matrices are, beginning from the right, an object translation matrix, the one-point perspective transformation matrix "M" (projector from viewpoint to origin is perpendicular to the viewplane), and the perspective matrix. The perspective transformation matrix transforms an arbitrary perspective-projection view volume into a parallel-projection view volume. When used in conjunction with a normalizing matrix, which is omitted here, and with proper selection of the constants C and D, a canonical view volume results.

The views which result from this configuration are rather strange in that the inside surfaces of an opaque object are not visible while external surfaces behind the viewpoint are visible. The viewplane pixels for each viewpoint are calculated by incrementally translating (i.e. changing a and b) in the x, y, 0 plane between each view computation.

Figure 2:
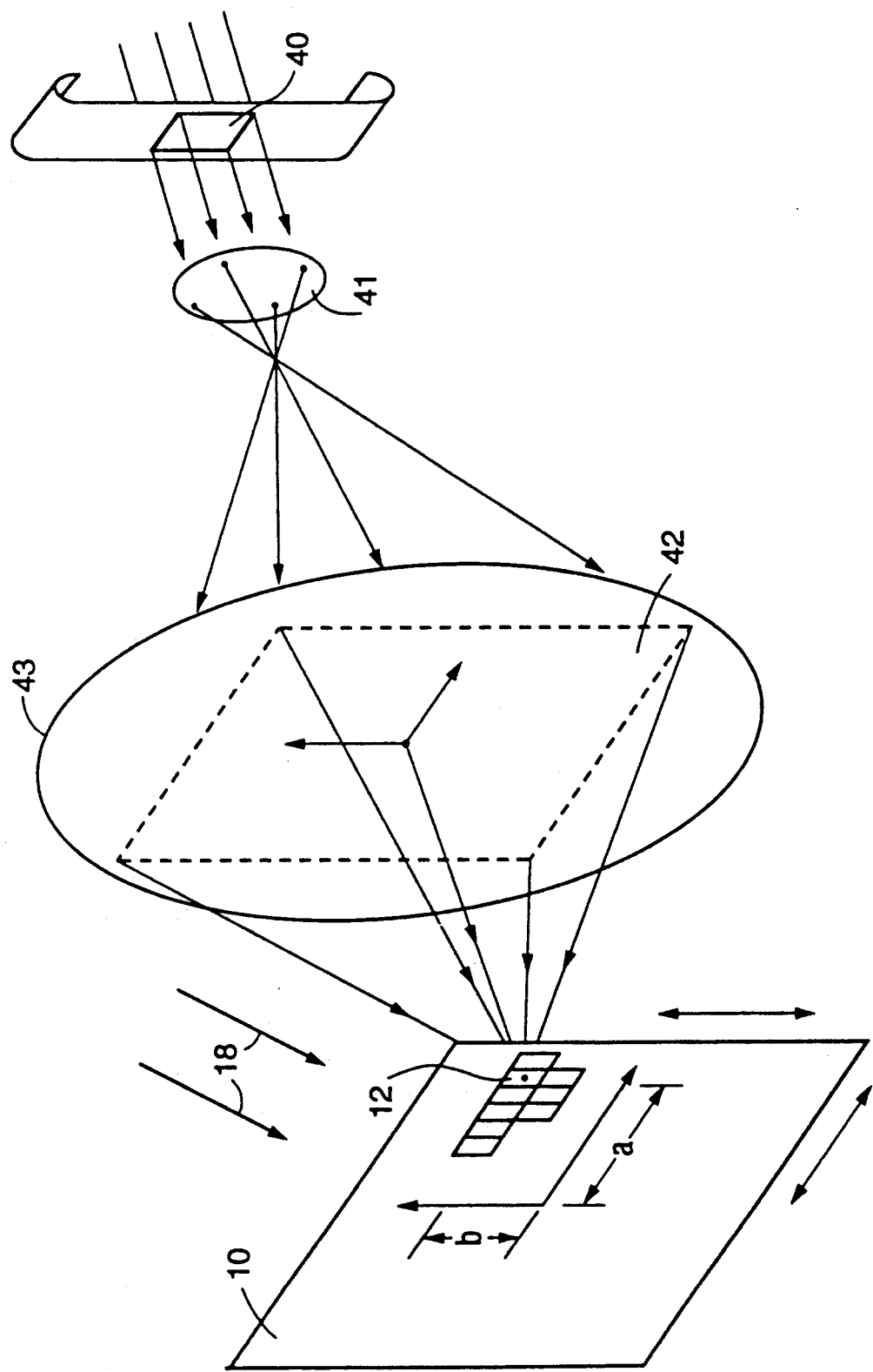
FIG. 2 is a schematic perspective illustration of an example optical setup for constructing a hologram from transparencies made by techniques of FIG. 1.

A system like that shown in FIG. 2 is used to form the contiguous image-plane hologram elements. It is similar to a system disclosed in U.S. Pat. No. 4,778,262. In the figure, the viewplane projection data for each element 12 is recorded as a transparency 40 and illuminated with a laser. Lens 41 projects the image of the transparency into plane 42, shown in FIG. 2 to be coincident with the light-concentrating lens 43. The image presented in 40 for the construction of any element, is the viewplane projection which was computed for that viewpoint. The final result is that the laser light rays passing through every part of the composite hologram 10 simulate the computed rays passing through that same element. This simple equivalence disregards any scale changes which may be required. The reference beam 18 is required for the construction of each of the hologram elements, but uniquely for these hologram elements, the required laser beam coherence length can be very short. It need not exceed the dimension of the element.

Figure 3:
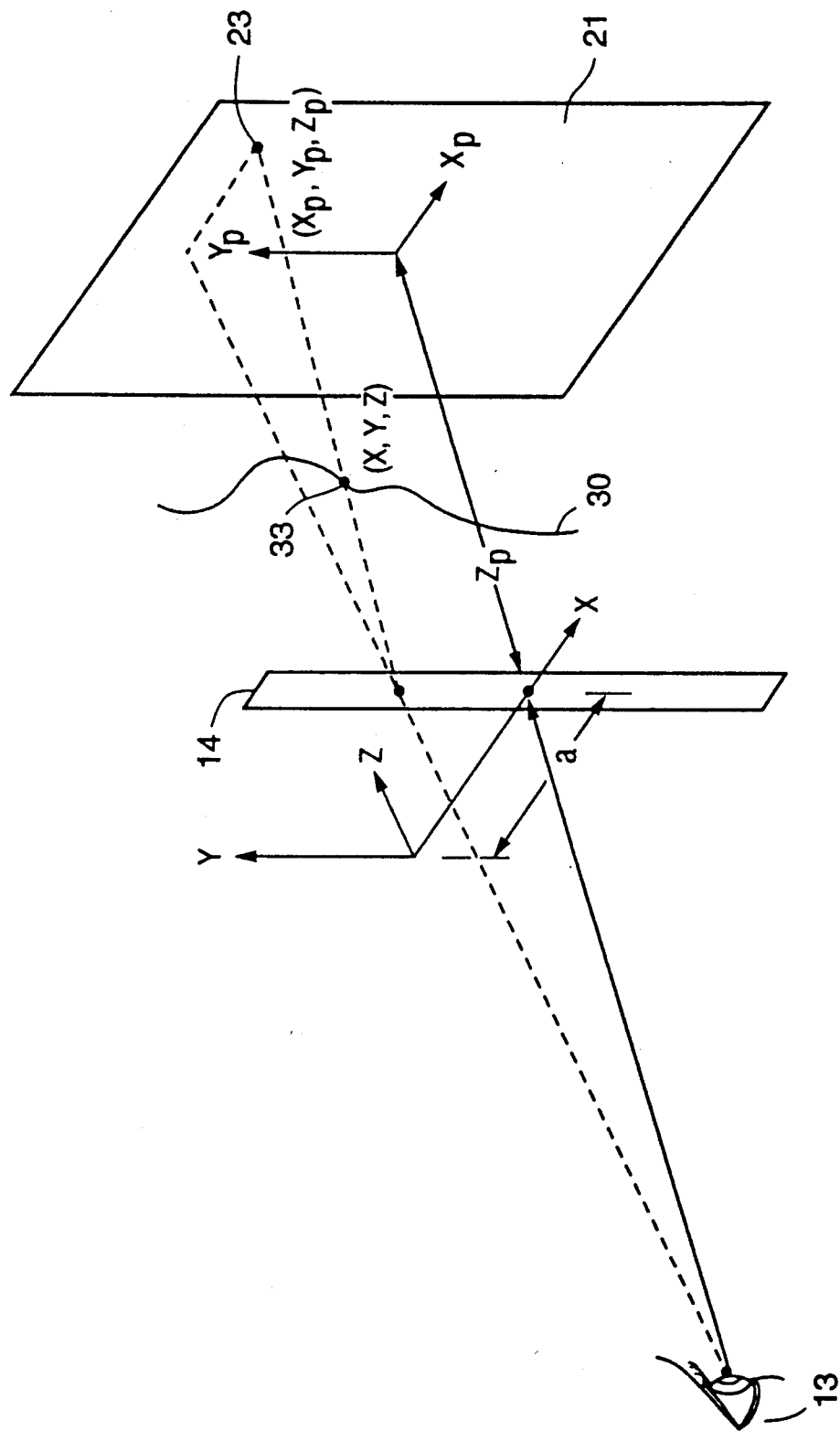
FIG. 3 illustrates the geometry used for calculations of the method when vertical image parallax is not included.
Figure 4:
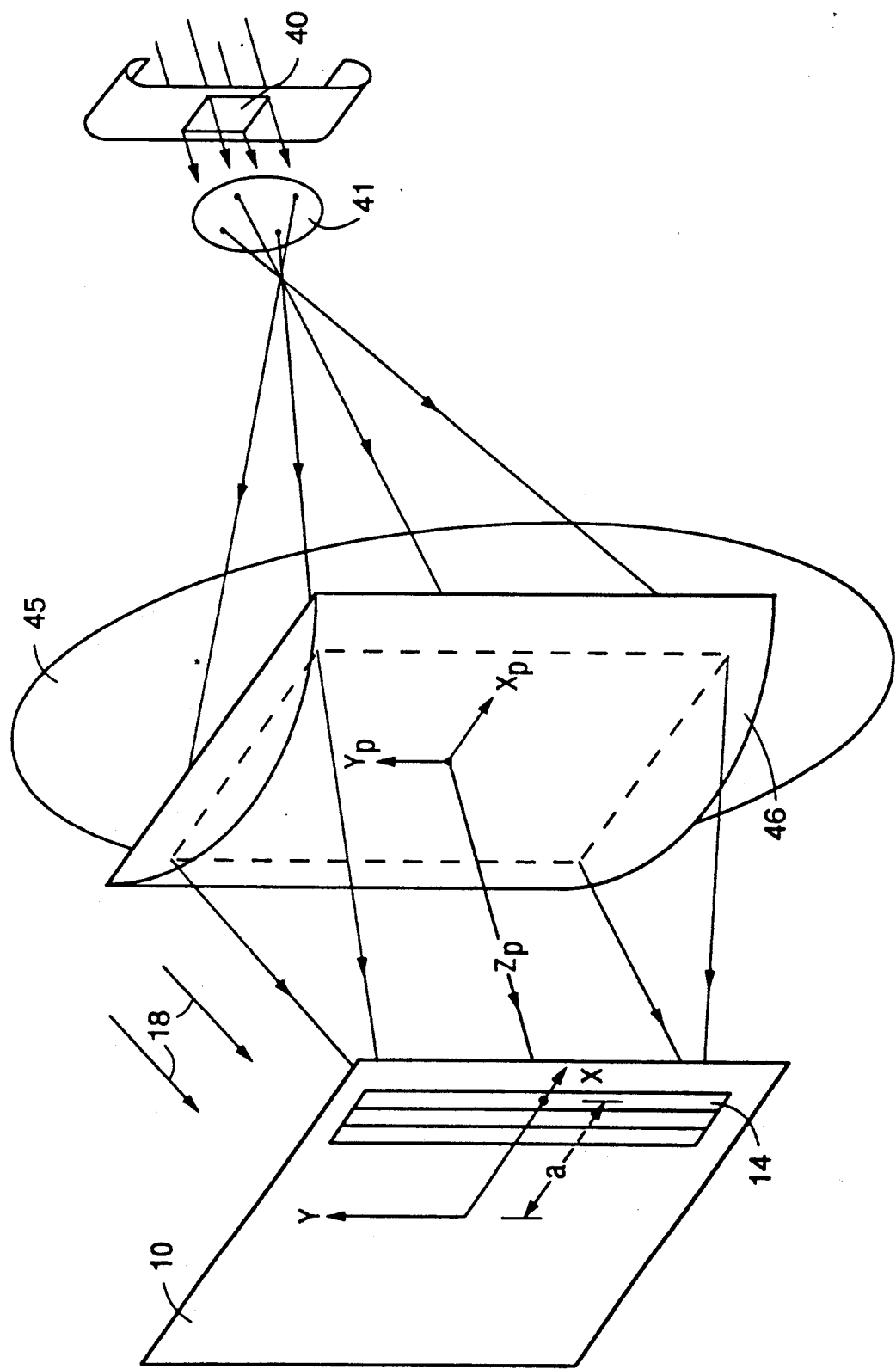
FIG. 4 is a schematic perceptive illustration of an example optical setup for constructing a hologram from transparencies made by techniques of FIG. 3.

The removal of vertical parallax is often a practical necessity for improved image visibility and reduced computation. The technique used to create these elemental rainbow holograms is somewhat of a hybrid, as shown in FIGS. 3 and 4. In the horizontal direction (dealing with vertical lines only) the geometry is like that of FIG. i. The viewpoint is located on element 14 within the object's primary plane. But, in the vertical direction the viewpoint is selected to mimic the position of the completed hologram viewer's eye, shown as 13 in FIG. 3. The combination results in hologram elements 14 which are tall and narrow and which are laid down side by side. FIG. 4 illustrates a method of hologram reconstruction. While the procedure is similar to that shown in FIG. 2, it requires that the hologram be translated in the horizontal direction only during construction.

Note that the spherical lens 43 of FIG. 2 has be replaced by the lens pair 45 and 46. Lens 45 is a spherical lens and lens 46 is a cylindrical lens. For the special case in which the hologram is meant to be viewed from relatively large distances, the spherical lens 45 essentially collimates the light which enters it from lens 41 and the film transparency 40. Thus all of the rays pass through the hologram element 14 in horizontal sheets which are parallel to each other.

In this discussion, scaling, has been disregarded since it is a function of the film size and lens magnification.

Insight into the modeling required for the geometry of FIG. 3, may be gained from the examination of a method which uses standard software routines. A taper routine is first used to compress a rectangular object volume into a wedge whose vertex runs along the x axis. The taper routine leaves object points on the $z=z_p$ plane unaltered, but locates those close to the $z=0$ plane almost on the $y=0$ plane. In the next operation, the eyepoint is moved close to the origin and the appropriate perspective transformation yields the correct view data for the required elemental hologram strip. The unmodified taper routine may be used for objects confined to the $z>0$ volume. It cannot be used for objects subtending the $z=0$ plane.

In order to construct the elemental views required for vertical parallax removal, the x and y coordinates are treated differently. Homogeneous coordinate system matrices, like those of equation (1), can no longer be used. The image point 23 in the viewplane 21 has coordinates $x_p, y_p, z_p$ which are related to the x, y, z coordinates of the object point 33 in the following manner:

$$(x_p, y_p, z_p)_a = \left( \frac{(x-a)z_p}{z}, y \frac{d+z_p}{d+z}, z \right) \quad (2)$$

An important and elegant aspect of the homogeneous coordinate system perspective transformation matrix "M", as used in equation (1), is that it preserves relative depth, straight lines and planes. This preservation greatly facilitates the subsequent operations. The scan-line conversion process faithfully fills in all the points interior to bounded planar primitive edges, which were originally omitted in the modeling. That is, no ambiguities in the z value exist for the interior points. Unfortunately, neither straight lines nor planes are preserved by the transformation of equation (2), nor, for that matter are they with the "taper" transformed vectors. Edges my be preserved by adding sufficient edge points prior to transformation. Even with these additions, planes are transformed into distorted surfaces whose edges no longer adequately define the location of interior points.

Unfortunately the scan-line conversion process locates these interior points on lines (usually horizontal) joining edge points. This deficiency manifests itself as incorrect first surface determinations throughout the interior of the primitives.

A corrective procedure places a sufficiently fine mesh into each pre-transformed surface. Of course, as the mesh fineness becomes greater, the process approaches that of scan converting prior to transformation, and the transformation procedure may become compute intensive.

Additional problems arise in dealing with objects which subtend the $z=0$ axis. These problems cannot be disregarded with image-plane holograms of either the rainbow or full-parallax variety. In general, the procedure is computationally unorthodox because surfaces cannot be excluded even though they are behind the viewpoint. This is a departure from conventional methods because a clipping plane is usually provided which prohibits inclusion of images behind this viewpoint. Moving this clipping plane as required for the present system is not fundamentally difficult, but it is accompanied by other problems. First is the obvious one of singularities for object points in the $z=0$ plane. This can be handled by moving these points into a new plane which is just slightly removed from $z=0$. But another subtle problem remains. Polygons whose boundaries are entirely contained in that portion of the view volume beyond the viewpoint i.e. with $z>0$, are handled in the usual way. Similarly, polygons with all boundaries in the volume $z<0$ are peculiar only in that their projections are inverted. But, polygons whose edges intersect the $z=0$ plane, are transformed by equation (1) or (2) into figures with discontinuous edges. These discontinuities are a result of the inversion experienced by the edges in traversing the $z=0$ plane. Since this transformation is performed prior to scan line conversion and filling, a continuity of edges must be reestablished. A procedure which rectifies this problem requires the insertion of two more clipping planes which are placed close to, and on either side of the $z=0$ axis. The object is effectively divided into two portions prior to the perspective transformation. One portion is restricted to the volume $z>0$, and the other is restricted to the volume $z<0$. An absence of planes which traverse the $z=0$ axis is thus guaranteed.

Figure 5:
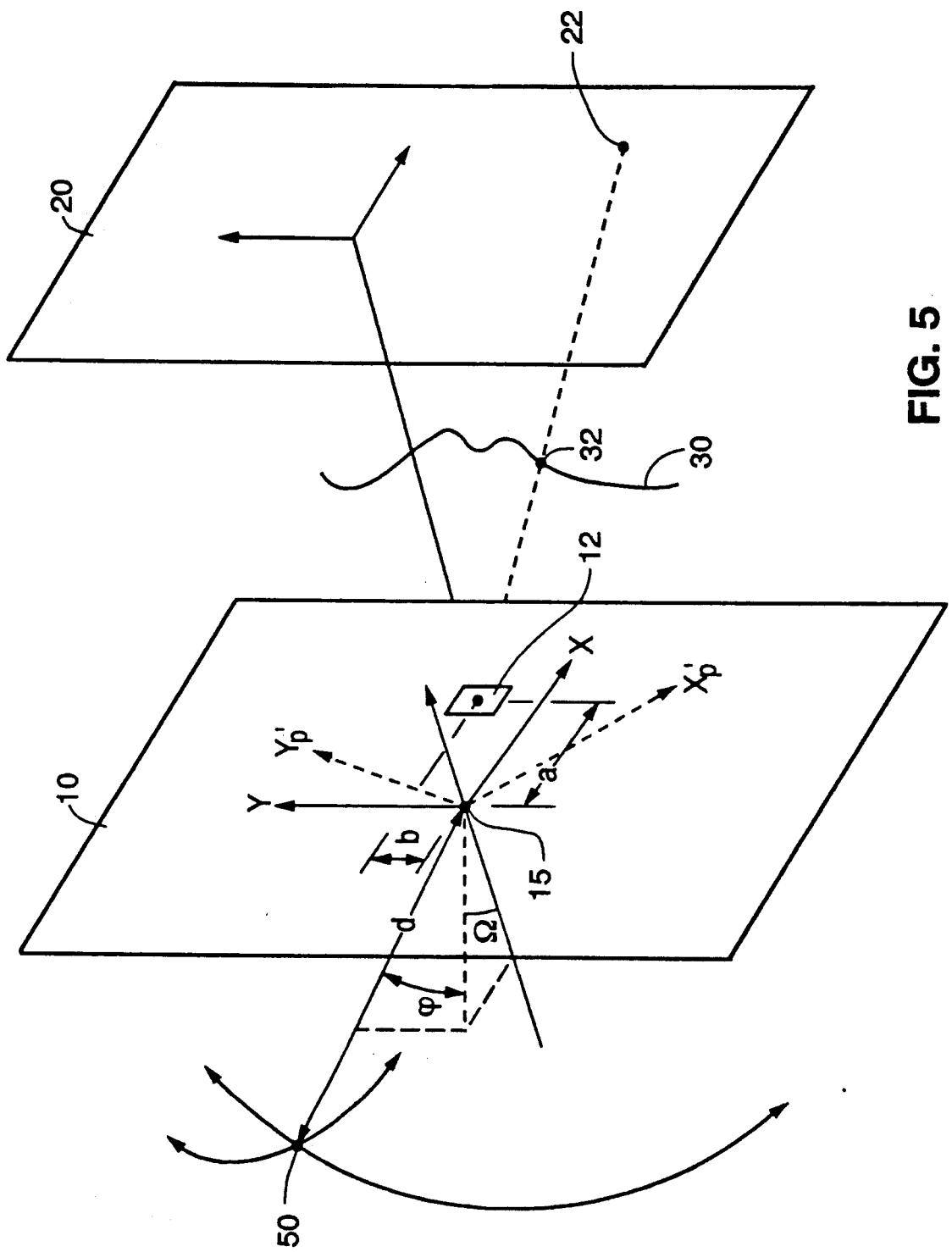
FIG. 5 illustrates the collection of conventional views of a computer generated image which are collected from viewpoints on a spherical surface.

There is another way in which the required elemental views may be generated. With this method many fully rendered conventional views of the computer generated object are collected. In FIG. 5, these views are computed for viewpoints, such-as viewpoint 50, which lie on a spherical surface of radius 'd' which is centered at the coordinate system origin 15 in the hologram surface 10. These conventional viewplane projections contain enough information to build the required views for the elements in the hologram plane which passes through the object. Optimum utilization of the technique requires that each of the original viewplane projection pixels, whose viewpoint orientation is designated by the angles $\alpha$ and $\phi$ in FIG. 5, be reassigned to elements whose location in the hologram plane 10 is given by $$\begin{bmatrix} a \\ b \\ 1 \end{bmatrix} = \begin{bmatrix} \frac{d}{\cos\alpha} & 0 & 0 \\ -d\tan\alpha\tan\phi & \frac{d}{\cos\phi} & 0 \\ \frac{-\tan\alpha}{\tan\phi} & -\tan\phi & d \end{bmatrix} \begin{bmatrix} x_p' \\ y_p' \\ 1 \end{bmatrix}_{a,\phi} \quad (3)$$

where $x_p', y_p'$ is the pixel location in the original viewplane. The prime superscript has been added here to avoid confusion with the coordinates of the new elemental view projection plane. The positions of the pixels within the new elemental projection plane 20 are, $$\begin{bmatrix} x_p \\ y_p \\ 1 \end{bmatrix}_{a,b} = \begin{bmatrix} 1 & 0 & d\sin\alpha\cos\phi \\ 0 & 1 & -d\sin\phi \\ 0 & 0 & \dfrac{d\cos\alpha\cos\phi}{z_p} \end{bmatrix} \begin{bmatrix} a \\ b \\ 1 \end{bmatrix} \quad (4)$$

This sorting operation must be carried out for all of the original viewplane projections. This analysis is applicable only to the case for which the original views are calculated from viewpoints spaced across a spherical (or cylindrical if vertical parallax is missing) surface centered on the origin.

Figure 6:
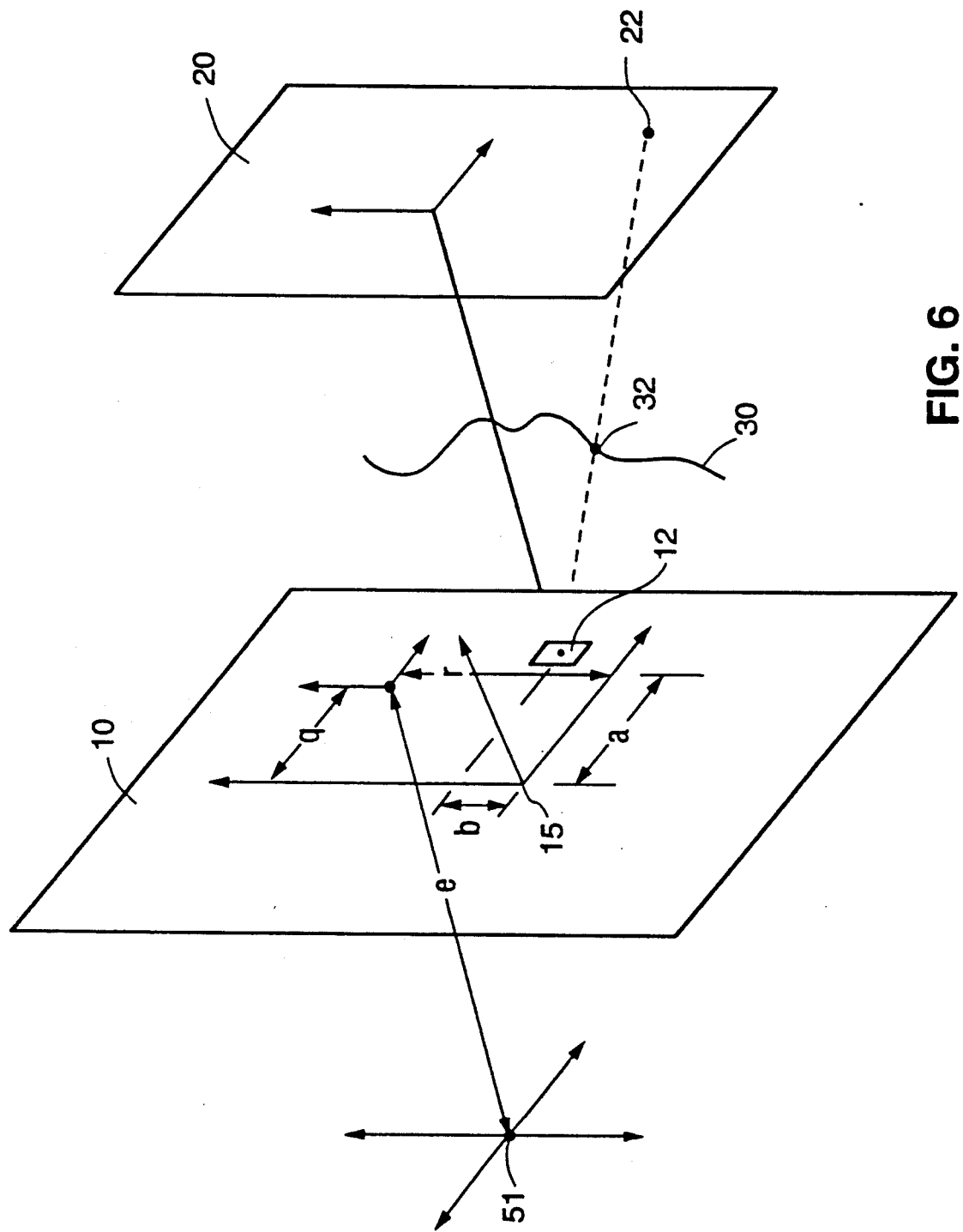
FIG. 6 illustrates the collection of conventional views of a computer generated object which are collected from viewpoints on a planar surface.

In FIG. 6, the original views are collected from viewpoints which lie on a plane located at some distance 'e' from the desired hologram plane rather than on a spherical surface located at radius 'd' from point 15 within the hologram plane. In figure 6, the viewpoint 51 has been translated in the x and y positions by distances q and r respectively. For this geometry, the original viewplane pixel, with coordinates $x_p'$, $y_p'$, is reassigned to the element 12 whose location in the hologram plane 10 is given by $$\begin{bmatrix} a \\ b \\ 1 \end{bmatrix} = \begin{bmatrix} 1 & 0 & q \\ 0 & 1 & r \\ 0 & 0 & 1 \end{bmatrix} \begin{bmatrix} x_p' \\ y_p' \\ 1 \end{bmatrix}_{q,r} \quad (5)$$

The new pixel position 22 at $x_p$, $y_p$ in this new elemental projection plane is $$\begin{bmatrix} x_p \\ y_p \\ 1 \end{bmatrix} = \begin{bmatrix} 1 & 0 & -q \\ 0 & 1 & -r \\ 0 & 0 & e/z_p \end{bmatrix} \begin{bmatrix} a \\ b \\ 1 \end{bmatrix} \quad (6)$$

Here again the sorting must be carried out for all of the pixels in each of the original viewplane projections.

When these post-rendering methods which were just described are applied to objects which lack vertical parallax, the procedure is simplified. For example, if the original views are collected from positions on an arc centered on the origin (point 15 in FIG. 5), the original pixels are reassigned to elemental strips, like 14 in FIG. 4. By setting $\phi = 0$ in equation (3), the position of this elemental strip in the $z=0$ plane is determined to be, $$a = \frac{dx_p'}{d\cos\alpha - x_p'\sin\alpha} \quad (7)$$

Similarly, by setting $\phi = 0$ in equation (4), the x position of the pixels in the elemental viewplane is, $$x_p = z_p \frac{(a + d\sin\alpha)}{d\cos\alpha} \quad (8)$$

The y position results from a simple modification of the above equations. It can be shown to be, $$y_p = \frac{y_p'}{\cos\alpha} \left( \frac{z_p + d\cos\alpha}{d - x_p'\tan\alpha} \right) \quad (9)$$

Similarly by eliminating vertical parallax and collecting views along a straight line which is parallel to the hologram plane, the element 14 to which the pixels are reassigned is determined by setting $r=0$ in equation (5).

$$a = x_p' + q \quad (10)$$

Also by setting $r=0$ in equation (6)

$$x_p = \frac{z_p x_p'}{e} \quad (11)$$

The y position can be shown to be $$y_p = y_p' \left( \frac{z_p + e}{e} \right) \quad (12)$$

This geometry is unique because it is the only situation for which a pixel reassignment calculation is not required for every one of the original pixels.

This economy in the reassignment computation may be realized because each column of pixels (strip with constant x dimension) may be relocated intact to a pixel column in the new elemental viewplane. That is, pixels at different vertical levels (different values of y) in any column do not end up in different horizontal positions (different values of x) in the new elemental viewplanes. Also the relative y values are retained.

The simple system which maintains pixel column integrity in the reassignment process is similar to a method previously disclosed in a patent titled "System for Synthesizing Strip Multiplexed Holograms", U.S. Pat. No. 4,411,489, which issued in October 1983. That patent describes a method in which entire strips, which are several pixels wide, from conventionally collected views are transferred into a new viewplane for an image-plane hologram. In general the optimum and preferred process requires that each pixel in the original viewplanes be reassigned to a new pixel location, independently of adjacent or nearby pixels. The only situation for which this is not the case is that in which columns of the original views, each a single pixel in width, are reassigned to new column positions when the original views are collected (or computed) along a straight line path which is parallel to the plane of a flat, rainbow, composited hologram. Otherwise the process of transferring columns of original data intact into the new image-plane hologram viewplanes will lead to images having undesirable distortions and aberrations.

Configurations other than those presented in this disclosure may be used. For example, a more generalized analysis can be constructed for a so-called three point perspective projection in which the line-of-sight is not normal to the projection plane and viewplane, as it is in the foregoing. Also it should be noted, that with analytical modification, the methods described may be extended to handle hologram surfaces which are not flat; for example cylindrical holograms suitable for bottle labels.

Using systems like those shown in FIGS. 2 and 4 with the alternative, post-rendering method, should result in images which match the more direct methods previously discussed with reference to FIG. 1. One of the drawbacks of the post-rendering method however is that sufficiently large storage must be provided into which all of the original views are placed prior to initiation of primary-plane element construction.

It should be recognized that with the post-rendering techniques, other types of input data such as that obtained from cinema or video, may substitute for or embellish computer-generated imagery. For example video views of a real object can be digitized and processed in the same way as the viewplane data generated from a computer object.

Certain types of images common to holography, are particularly easy to handle with the procedures described herein. One of these images is the 2-D (two dimensional) image which lies on the hologram plane. Each projection plane 20 in FIG. 1 (or 21 in FIG. 3) is a uniform function containing no variations across the surface. Each pixel is identical to the others in every projection plane. Only the transmissivity of the transparencies 40 in FIG. 2 or FIG. 3, are different from each hologram element.

If the image is a single planar image which does not alter as one views it from different directions, but which is not on the hologram surface, then each projection plane view is a slightly different sample of this planar image. Adjacent views are identical except for a slight translation of area of the projection plane which is sampled. Furthermore, the required resolution at each image plane view is reduced as the distance from the planar image to the hologram declines. Images restricted to several such planes are similarly relatively easily handled.

A rule in optics states that rays which come to focus with resolution $\delta$ in some primary plane (In a preferred embodiment of this patent, the primary plane is the hologram plane itself.), must approximately subtend an angle $\Omega$ where $$\Omega \gtrsim \frac{\lambda}{\delta} \quad (13)$$

$\lambda$ is the wavelength of light used for the imaging. Furthermore this resolution of $\delta$ can be maintained over an image depth, $z_m$, of no more than $$z_m = \pm \frac{\delta^2}{\lambda} \quad (14)$$

Object points located at greater distances that $z_m$ from the primary plane are reconstructed with resolutions of $$\delta_m = \Omega z \sim \frac{\lambda z}{\delta} \quad (15)$$

Evidently increasing the resolution in the primary image plane results in a reduction in the resolution of other image points. From these observations, a method of determining the image resolution required of the computation may be established as follows. First, select a desired pixel resolution $\delta$. Next, determine from equation (14) if the image depth over which this resolution can be maintained is adequate. If it is not, increase $\delta$ to an acceptable limit. Finally, compute new ray directions through the object points at angles separated by $\Omega$ determined from equation (13). Smaller increments are redundant and do not serve to increase the holographic image resolution.

For this analysis, the size of the element $\delta$ is a single resolvable pixel in width. In this case, and using the method of resolution determination described here, the resulting projection plane data comprise the Fourier Transform of the pattern within this pixel. This means that a computer-generated hologram (bit-by-bit computation of the hologram element itself) for each element may be easily computed from this projection plane data. An entire composite hologram may be built up in this manner, and does not require the large storage needed for a true CGH as described previously.

Equations (13) and (14) can be recognized as the resolution and depth of focus equations for a conventional camera lens system, where $\Omega$ is the F number (lens aperture over the focal length, or image plane distance). Images from composite holograms like those described in this disclosure are like those in photographs obtained with relatively small aperture lenses, except for the one important difference. The image has very good parallax and this is what gives it three dimensionality. This parallax permits an axial or z direction resolution, $\sigma$, given by $$\sigma \sim \frac{\delta z}{\tan (\beta/2)} \quad (16)$$

where $\beta$ is the range of viewing angles. Composite holograms can match true classical holograms in their parallax capabilities. But classical holograms retain all the z dimensional information and this allows them to have infinite depth of focus since all image points are focused simultaneously. With a classical hologram, adjacent portions of the hologram and different views are not independent of each other. They are related by complex phase relationships as required from diffraction theory.

By incorporating phase relationships between pixels in adjacent projection planes in the composite process described in this disclosure, image resolution is improved, particularly for the image points most distant from the hologram plane. In the limit, as more phase information is recorded, the resulting hologram approaches that of a full computer generated hologram and contains image detail like a classical hologram.

The above description of methods and the construction used are merely illustrative thereof and various changes of the details and the method and construction may be made within the scope of the appended claims.

What is claimed is:

1. A method of constructing a composite hologram, comprising the steps of:
   generating computer data representing an object scene and its illumination,
   defining a hologram surface which passes through at least a portion of the object scene,
   dividing the hologram surface into a plurality of contiguous elemental areas,
   generating computer data representing a window through which the composite hologram is intended to be observed, said window placed at a position relative to the hologram surface which approximates an intended viewer position,
   inserting two clipping surfaces into an object volume, where the clipping surfaces are parallel to the hologram surface and are imperceptibly close to but on opposite sides of the hologram surface, thereby effectively dividing the object scene into two separate volumes with no points in said separate volumes remaining in the hologram surface itself,
   processing the computer data to determine for each of the elemental areas, a related viewplane image for each of the separate volumes, by performing first surface calculations in such a manner that opaque surfaces closer to the window overlay surfaces more distant from said window, combining, for each of the elemental areas, viewplane images for the two volumes, wherein the first surface calculations are carried out such that a viewplane from a first one of the volumes which is closer to the window overlays a view plane from a second one of the volumes, constructing elemental holograms, each of said elemental holograms being formed from combined viewplane images for a different one of the elemental areas, and forming a completed composite hologram from the elemental holograms, said composite hologram being capable of reconstructing an image of said object scene, while avoiding computational difficulties arising from points in the hologram surface.

2. The method of claim 1, wherein the step of determining related viewplane images includes the steps of:
providing a single viewpoint in each of said elemental areas for which horizontal perspective is computed, and
providing a second viewpoint beyond said window, for which vertical perspective is computed, said second viewpoint being common to more than one elemental area, whereby a composite hologram lacking vertical parallax is constructed.

3. The method of claim 1, wherein the step of processing the computer data includes the steps of:
determining image point locations in said viewplane image from the equation $$(x_p, y_p, z_p) = ((x-a)z_p/z, y_p(d+z_p)/(d+z), z)$$

where $x_p$ and $y_p$ are coordinates in the viewplane, "a" is the horizontal distance between a reference point in the hologram surface and a point in an elemental area, x, y, and z are coordinates of points in the image, and d and $Z_p$ are selected constants.

4. A method of calculating views from each portion of a flat hologram plane which can be used to form a three-dimensional image which straddles the hologram plane, comprising the steps of:
defining a vertical center line which lies on said hologram plane,
dividing said hologram plane into a plurality of contiguous, narrow, but tall hologram elements,
collecting a plurality of views of an object scene from viewpoints which lie on an arc of a circle centered on the said center line, representing each of said views as an array of viewplane pixels in a viewplane,
defining a window at a distance from said hologram elements, each window being divided into an array of window pixels,
assigning each column of viewplane pixels to a window of a hologram element, wherein the appropriate hologram element is determined by the equation $$a = dx_p'/(d \cos \alpha - x_p' \sin \alpha)$$

where a is the horizontal distance in the hologram plane between said center line and the hologram element, $x_p'$ is the horizontal distance in the viewplane between the viewplane column and a central column in the viewplane, α is the angle between a line which is perpendicular to the hologram plane, and a horizontal line joining the viewpoint and the center line, and d is a selected constant,
relocating each pixel in said column of viewplane pixels, together with its intensity value, to a pixel location in a column of window pixels of the window of said approximate hologram element, wherein this location is determined by the equations $$x_p = z_p \left( \frac{a + d \sin \alpha}{d \cos \alpha} \right)$$

and $$y_p = \frac{y}{\cos \alpha} ((x_p + d \cos \alpha)/(d + x_p' \tan \alpha))$$

where $x_p$ and $y_p$ are the horizontal and vertical distances of the window pixel from a central point in the window, y is the vertical distance of the viewplane pixel from a central point in the viewplane, and $z_p$ is a selected constant, and
determining intensity values for the window pixels in each hologram element window, which can be used to construct holograms in the hologram elements to create a composite hologram.

5. A hologram made by processing the intensity values determined according to the method of claim 4.

6. A method of calculating views from each portion of a flat hologram plane which can be used to form a three-dimensional image which straddles the hologram plane, comprising the steps of:
defining a vertical center line which lies on said hologram plane,
dividing said hologram plane into a plurality of contiguous narrow but tall hologram elements,
collecting a plurality of views of an object scene from viewpoints which lie on a straight line,
representing each of said views as an array of viewplane pixels in a viewplane,
defining a window at a distance from the hologram plane for each of said hologram elements, each window being divided into an array of window pixels,
assigning each column of viewplane pixels to a window of a hologram element, wherein the appropriate hologram element is determined by the equation $$a = x_p' + q$$

where $x_p'$ is the horizontal distance in the viewplane between the viewplane column and a central point of the viewplane, and q is the horizontal distance between a central point in the viewplane and the center line of the hologram plane,
relocating each pixel in said column of viewplane pixels, together with its intensity value, to a pixel location in a column of window pixels of the window of said appropriate hologram element, wherein this location is determined by the equations $$x_p = z_p x_p'/e$$

and $y_p = y_p'(z_p + e)/e$ where $x_p$ and $y_p$ are the horizontal and vertical distances of the window pixel from a central point in the window, $y_p'$ is the vertical distance of the viewplane pixel from a central point in the viewplane, and $Z_p$ and $e$ are selected constants, and determining intensity values for the window pixels in each hologram element window, which can be used to construct holograms in the hologram elements, thereby creating a composite hologram.

7. A hologram made by processing the intensity values determined according to claim 6.

8. A method of constructing a hologram from a computer-processed image comprising the steps of:

dividing an image volume into two parts, each of said parts enclosing a portion of the image volume on one side of, but excluding, a hologram surface, moving all image points which lie on the hologram surface to a new surface which is separated from the hologram surface by a small but imperceptible amount, but which lies within one of said parts, dividing the hologram surface into a plurality of contiguous elemental areas, computing image views on each of the parts from a viewpoint located within each of the elemental areas, combining the image views corresponding to each of the elemental areas to form a combined view for each of said elemental areas, creating elemental holograms in the elemental areas, each from its associated combined view, and combining the elemental holograms to form a completed hologram indicative of different viewpoints in the hologram surface, and which avoids computation problems normally associated with image points which are located in a surface containing viewpoints.

9. The method of claim 8, wherein the image lies entirely on the hologram surface prior to the step of moving the image points.

10. A completed hologram produced by performing the method of claim 8.

11. A method of constructing a hologram from a computer-processed image comprising the steps of:

dividing an image volume into two parts, each of said parts enclosing a portion of the image volume on one side of, but excluding, a hologram surface, inserting two clipping surfaces into the image, the clipping surfaces being placed infinitesimally close to, but on opposite sides of the hologram surface, thereby enclosing each of the two parts so that no portion of the image remains in the hologram surface, dividing the hologram surface into a plurality of contiguous elemental areas, computing image views on each of the parts from a viewpoint located within each of the elemental areas, combining the image views corresponding to each of the elemental areas to form a combined view for each of said elemental areas, creating elemental holograms in the elemental areas, each from its associated combined view, and combining the elemental holograms to form a completed hologram indicative of different viewpoints in the hologram surface, and which avoids computation problems normally associated with image points which are located in a surface containing viewpoints.

12. The method of claim 11, also including the steps of:

adding the sufficient new points to edges which are intersections of surfaces of the image and clipping surfaces to facilitate further image processing.

13. A completed hologram produced by performing the method of claim 11.

14. A method of constructing a hologram from a computer-processed image comprising the steps of:

dividing an image volume into two parts, each of said parts enclosing a portion of the image volume on one side of, but excluding, a hologram surface, dividing the hologram surface into a plurality of contiguous elemental areas, generating computer data representing a window through which the completed hologram will be observed, said window placed at a substantially greater distance from the hologram surface than points in the image, computing image views on each of the parts from a viewpoint located within each of the elemental areas, with hidden surface removal being carried out so that opaque surfaces of the image which are nearest said window hide other surfaces which they overlay, combining the image views corresponding to each of the elemental areas to form a combined view for each of said elemental areas, creating elemental holograms in the elemental areas, each from its associated combined view, and combining the elemental holograms to form a completed hologram indicative of different viewpoints in the hologram surface, and which avoids computation problems normally associated with image points which are located in a surface containing viewpoints.

15. A completed hologram produced by performing the method of claim 14.

16. A method of constructing a hologram from a computer-processed image comprising the steps of:

dividing an image volume into two parts, each of said parts enclosing a portion of the image volume on one side of, but excluding, a hologram plane, dividing the hologram plane into a plurality of contiguous elemental areas, computing image views on each of the parts from a viewpoint located within each of the elemental areas, by relocating points of said computer-processed image to new positions given by the matrix equation $$\begin{bmatrix} x_p \\ y_p \\ 0 \\ 1 \end{bmatrix} = \begin{bmatrix} 1 & 0 & 0 & 0 \\ 0 & 1 & 0 & 0 \\ 0 & 0 & 0 & 0 \\ 0 & 0 & 0 & 1 \end{bmatrix} \begin{bmatrix} 1 & 0 & 0 & 0 \\ 0 & 1 & 0 & 0 \\ 0 & 0 & C & D \\ 0 & 0 & 1/z_p & 0 \end{bmatrix} \begin{bmatrix} 1 & 0 & 0 & -a \\ 0 & 1 & 0 & -b \\ 0 & 0 & 1 & 0 \\ 0 & 0 & 0 & 1 \end{bmatrix} \begin{bmatrix} x \\ y \\ z \\ 1 \end{bmatrix}$$

wherein x, y, and z are image point coordinators, "a" and "b" are coordinates of the viewpoint in the hologram plane, $x_p$ and $y_p$ are new position coordinates, and $z_p$ is a selected constant, combining the image views corresponding to each of the elemental areas to form a combined view for each of said elemental areas, creating elemental holograms in the elemental areas, each from its associated combined view, and combining the elemental holograms to form a completed hologram indicative of different viewpoints in the hologram surface, and which avoids computation problems normally associated with image points which are located in a surface containing viewpoints.

17. A completed hologram produced by performing the method of claim 16.

* * * * *

UNITED STATES PATENT AND TRADEMARK OFFICE
CERTIFICATE OF CORRECTION

PATENT NO. : 5,237,433
DATED : August 17, 1993
INVENTOR(S) : K.A. HAINES, ET AL.

It is certified that error appears in the above-indentified patent and that said Letters Patent is hereby corrected as shown below:

IN THE DRAWINGS

In Figure 3, --d-- should be inserted along the line segment between eye 13 and surface 14 to identify the length of said line segment.

In Figure 5, "$\Omega$" should read --$\alpha$--.

In Column 6, line 63, "$\frac{-\tan\alpha}{\tan\phi}$" should read -- $\frac{-\tan\alpha}{\cos\phi}$ --.

In Column 9, line 49, "~" should read --≂--.

In Column 10, line 20, "~" should read --≂--.

In Column 11, line 35, "$y_p(d + z_p)$" should read --$y(d + z_p)$--.

In Column 12, line 17, "$(d + x_p{}')$" should read --$(d - x_p{}')$--.

Signed and Sealed this

Thirty-first Day of May, 1994

Attest:

BRUCE LEHMAN

*Attesting Officer*   Commissioner of Patents and Trademarks